(12) United States Patent
Rebbereh

(10) Patent No.: US 7,573,153 B2
(45) Date of Patent: Aug. 11, 2009

(54) POWER SUPPLY APPARATUS FOR FIELD DEVICES

(75) Inventor: Carsten Rebbereh, Fürth (DE)

(73) Assignee: Siemens Aktiengesellschaft, München (DE)

( * ) Notice: Subject to any disclaimer, the term of this patent is extended or adjusted under 35 U.S.C. 154(b) by 181 days.

(21) Appl. No.: 11/610,773

(22) Filed: Dec. 14, 2006

(65) Prior Publication Data

US 2008/0143190 A1 Jun. 19, 2008

(30) Foreign Application Priority Data

Dec. 23, 2005 (DE) .................. 10 2005 061 845

(51) Int. Cl.
*H02J 3/14* (2006.01)
(52) U.S. Cl. ........................ 307/38; 307/113
(58) Field of Classification Search .................. 307/38, 307/42, 115; 323/371; 439/638, 650
See application file for complete search history.

(56) References Cited

U.S. PATENT DOCUMENTS

| | | | |
|---|---|---|---|
| 4,320,386 A * | 3/1982 | Harris | 340/825.22 |
| 5,241,217 A | 8/1993 | Severinsky | |
| 5,600,107 A * | 2/1997 | Tsai | 200/1 R |
| 5,708,551 A | 1/1998 | Bostatelli | |
| 6,038,115 A | 3/2000 | Kleemeier et al. | |
| 6,137,776 A | 10/2000 | Bauerschmidt et al. | |
| 6,486,568 B1 * | 11/2002 | King et al. | 307/66 |
| 6,819,012 B1 * | 11/2004 | Gabrys | 307/68 |
| 6,875,059 B2 * | 4/2005 | Sivertsen | 439/638 |
| 2006/0194467 A1 * | 8/2006 | Beasley et al. | 439/339 |

FOREIGN PATENT DOCUMENTS

| | | |
|---|---|---|
| DE | 196 01 883 A1 | 7/1997 |
| DE | 196 30 614 A1 | 2/1998 |
| DE | 100 63 084 | 7/2002 |
| DE | 199 43 503 | 3/2004 |
| EP | 0 593 995 A | 4/1994 |
| EP | 0 593 995 A1 | 4/1994 |
| EP | 1 086 774 A2 | 3/2001 |
| JP | 01 148034 A | 6/1989 |
| WO | WO 02/05449 A | 1/2002 |

OTHER PUBLICATIONS

Lasttrennschalter 3KL, 3KM, 3KA, 3KE, in: Siemens Niederspannungs-Schalttechnik-Katalog NS K 1999/2000, Kapitel: Schaltgeräte zur Energieverteilung, Seite 12/34-12/35.

* cited by examiner

*Primary Examiner*—Albert W Paladini
*Assistant Examiner*—Daniel Cavallari
(74) *Attorney, Agent, or Firm*—Henry M. Feiereisen; Ursula B. Day

(57) ABSTRACT

An apparatus for supplying DC power to a field device, such as a motor, starter or actuator, includes a multi-pole main switch and a DC voltage supply device, both of which are connected at their respective AC-voltage input sides to a line voltage via a line protection. The DC-voltage side of the DC voltage supply device is connected via a two-pole switch to respective lines of the same power cable that connects output terminals of the apparatus to the field device. The multi-pole main switch and the two-pole switch are ganged. This approach eliminates a separate DC power cable between the apparatus and the field device.

9 Claims, 2 Drawing Sheets

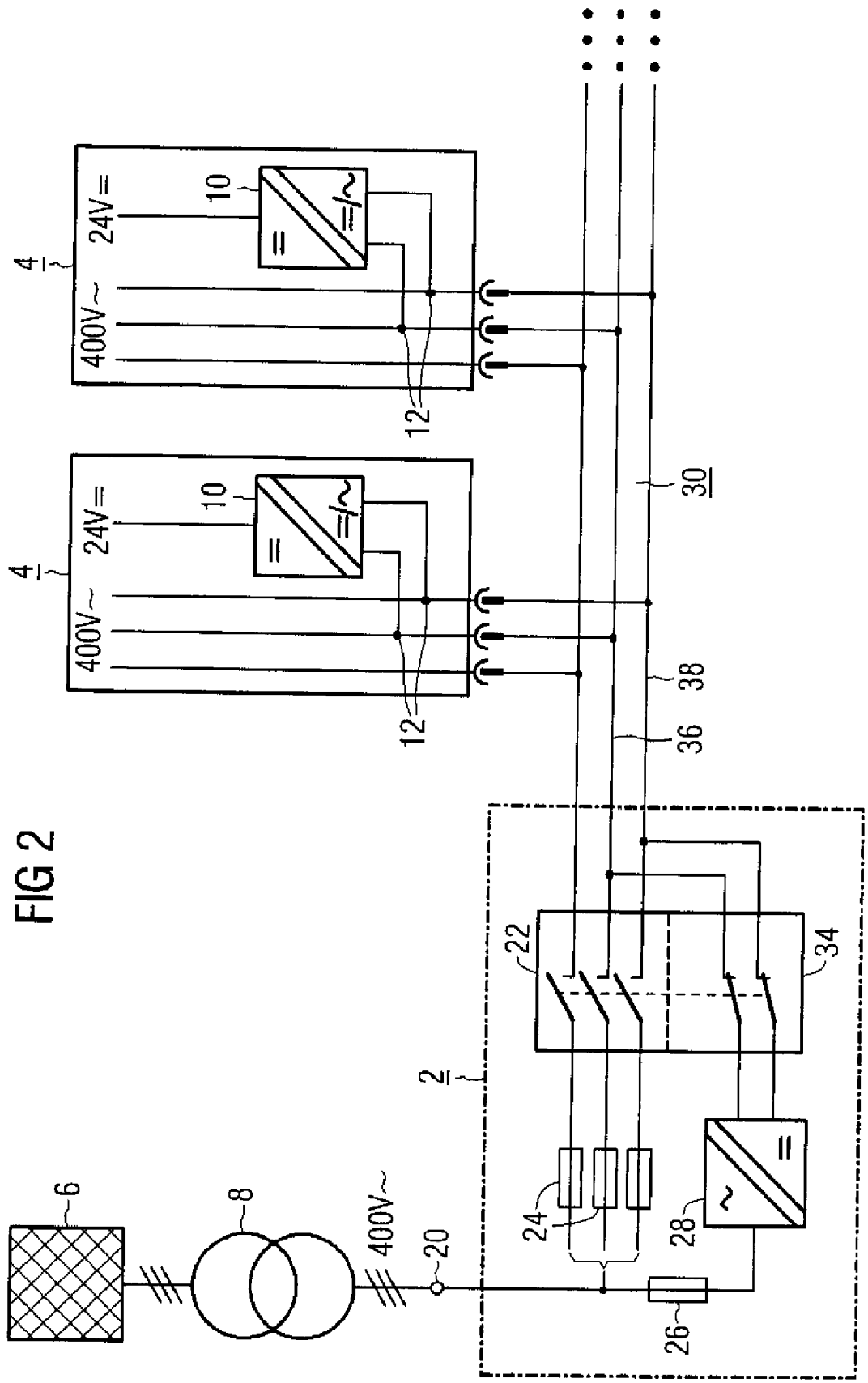

POWER SUPPLY APPARATUS FOR FIELD DEVICES

CROSS-REFERENCES TO RELATED APPLICATIONS

This application claims the priority of German Patent Application, Ser. No. 10 2005 061 845.6, filed Dec. 23, 2005, pursuant to 35 U.S.C. 119(a)-(d), the content of which is incorporated herein by reference in its entirety as if fully set forth herein.

BACKGROUND OF THE INVENTION

The invention relates to an apparatus for supplying power to a field device, such as an actuator or motor.

Nothing in the following discussion of the state of the art is to be construed as an admission of prior art.

In the case of field devices of all types, including converters, motor starters, input/output modules, it is necessary to have to communicate with the devices, for example, via a field bus even in the case in which the line voltage supply is switched off. This is particularly necessary for bringing the devices into operation, but also for diagnostic purposes during operation. When they are brought into operation, the field devices are not constantly connected to the line voltage supply. As a result, these field devices cannot be supplied from the system voltage.

European Pat. No. EP 0 593 995 A1 discloses an apparatus, in the case of which field devices, for example converter-fed motors in a conveying system, are connected to a central control cabinet by means of a multiphase electrical power line, a DC supply line and a data bus. A multi-pole switching contactor, a DC voltage supply device and a control system are accommodated in this central control cabinet. The multi-pole switching contactor is connected to a power supply system on the system side. In the field devices, all three types of line are looped through, i.e. the lines are therefore not interrupted at any point, but the required currents or data are merely tapped off.

This variant, in which an auxiliary voltage is brought to the field devices by means of a parallel cable, has the following advantages:

complete disconnection of the line voltage is possible, as a result of which:
  the field device can be operated in a hazard-free manner given the available communication capability,
  the risk when the field device is brought into operation is reduced and, as a result,
  it is possible for the remote drive system to be brought to a standstill safely.

However, this apparatus for supplying power to at least one field device also has disadvantages:

Additional cable having a large cross section (owing to the voltage drop along the cable) results in additional system costs.

In the case of the additional cable with a small cross section, an intermediate supply of the auxiliary voltage is required in the panel.

Additional plug-in connectors (at least terminals and bushings) are required which represent a considerable cost factor, particularly in the case of devices having a high degree of protection, primarily if it is also necessary for the auxiliary voltage to be looped through.

Considerable extra complexity is required in the field device.

It would be desirable to modify the prior art apparatus which for supplies power to at least one field device in such a way that a separate power cable for the DC supply is no longer required.

SUMMARY OF THE INVENTION

According to one aspect of the invention, an apparatus for supplying DC power to at least one field device includes a multi-pole main switch having an input side receiving an AC voltage from a power mains and an output side supplying a switched AC voltage to output terminals of the apparatus, a power cable connecting the output terminals to the at least one field device, and a DC voltage supply device having an input side receiving the AC voltage from the power mains and a DC voltage output side connected via a two-pole switch to two of the output terminals of the apparatus, wherein the multi-pole main switch and the two-pole switch are operatively connected, i.e., ganged. The contacts may be implemented as break-before-make contacts Because the DC voltage supply device of the power supply apparatus is always connected to two conductors of the available power cable by means of a switch when the line voltage supply is disconnected, the field devices can be supplied with a DC voltage without requiring a separate DC power cable. During normal operation, the output side of the DC voltage supply device in the power supply apparatus is disconnected from the lines of the power cable. During this normal operating mode, the field devices generate the DC voltage required for operation internally from the line voltage.

Since an additional DC supply cable is no longer required, additional plugs are also no longer required on the field devices. This is a considerable cost advantage in particular in the case of devices having a high degree of protection. Since the cross section of the power cable is larger than the cross section of a previously used additional DC supply cable for the DC supply, the voltage drop along the line of the power cable is less in the case of a DC supply. As a result, it is possible for more field devices to be connected to the power supply apparatus. In addition, the DC voltage can be increased up to a safety limit, which lowers the operating current and therefore also the voltage drop along the power cable.

Embodiments of the invention may include one or more of the following features. Since the DC voltage can only be connected to two lines of the power cable after the line voltage has been disconnected, the power supply in each field device, which may be implemented as a switched mode power supply, may require buffering or an existing buffer time may have to be adjusted. The multi-pole main switch and the two-pole switch may form a single unit, and the multi-pole main switch may be a load-break switch.

The field device may be a converter, a motor starter, and input/output module, or an actuator. The input side of the multi-pole switch or the input side of the DC voltage supply device, or both, may include as line protection a fuse.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows an apparatus according to the invention.

DETAILED DESCRIPTION OF PREFERRED EMBODIMENTS

Figure 1:
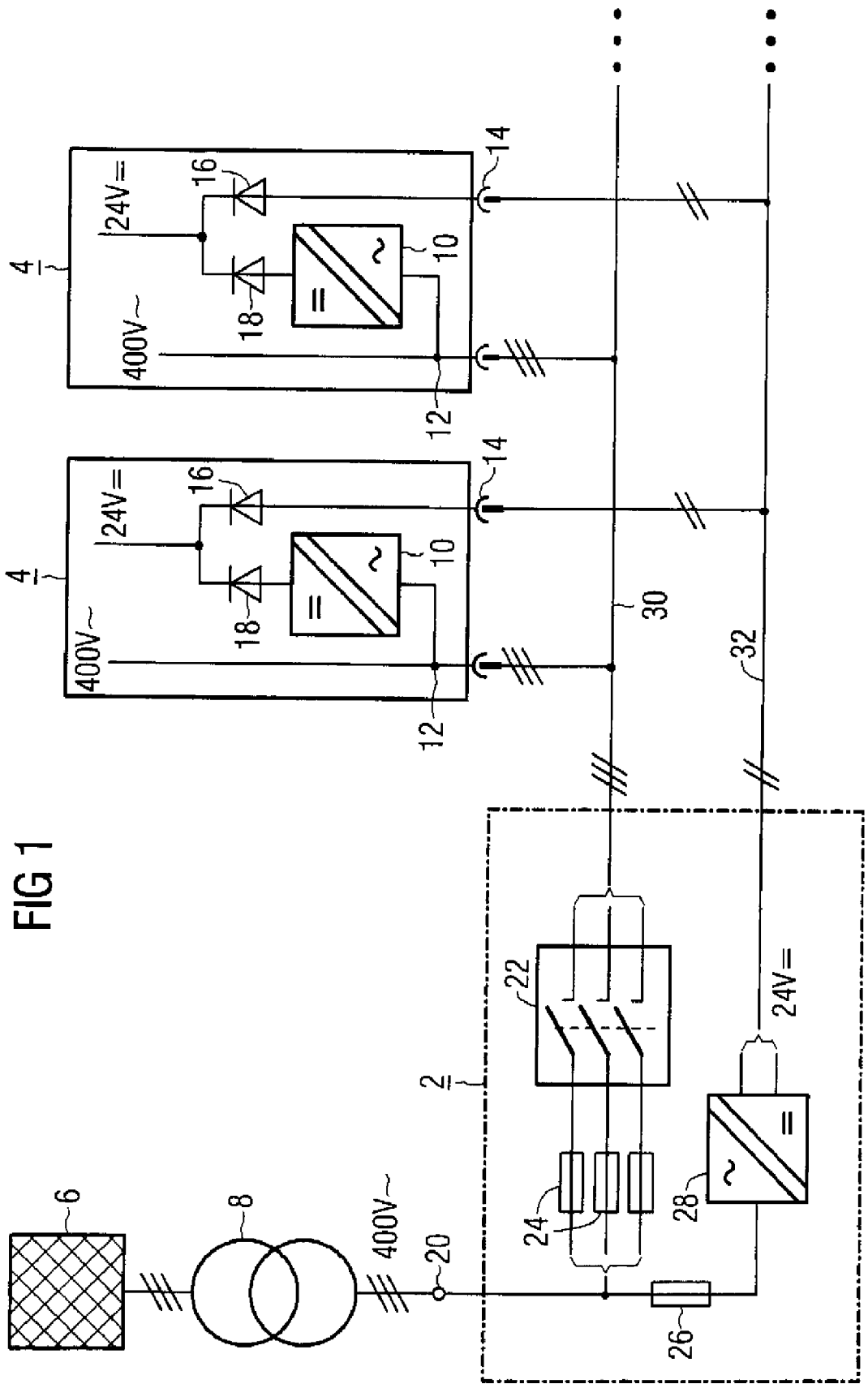
FIG. 1 shows an prior art apparatus.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is an apparatus 2 for supplying power to at least one field device, a field device 4, a power supply system 6, and a line voltage transformer 8. For reasons of clarity, only the switched mode power supply 10 is illustrated schematically in each field device 4. On the AC-voltage side, this switched mode power supply 10 is linked to a terminal 12 for the line voltage supply. A floating DC voltage of, for example, 24 V is applied to the output of this switched mode power supply 10. This DC voltage will be referred to below as auxiliary voltage. In addition, each field device 4 has an additional terminal 14. This terminal 14 is connected to a terminal 18 via a decoupling diode 16, with the output of the switched mode power supply 10 also being connected to terminal 14 by means of an additional decoupling diode 18.

The apparatus 2 for supplying power to these field devices 4 is arranged at a central position, for example, in the immediate vicinity of a power mains feed point 20. This apparatus 2 has a multi-pole main switch 22, for example a load-break switch, a plurality of fuses 24 and 26, and a DC voltage supply device 28. The secondary side of the line voltage transformer 8 is connected on the to the line voltage feed point 20, this transformer being connected on the primary side to the power mains 6. Such a line voltage transformer 8 is not required if the value for the voltage supply of the field devices 4 corresponds to the voltage of the power mains. Each pole of the main switch 22 is linked on the system side to an input of the apparatus 2 or the line voltage feed point by means of a fuse 24. On the load side, each pole of this main switch 22 is connected to a line of a power cable 30 for the field devices 4. On the AC-voltage side, the DC voltage supply device 28 is likewise linked to an input of the apparatus 2 or the line voltage feed point 20 by a fuse 26. On the DC-voltage side, this DC voltage supply device 28 is connected to a DC supply cable 32, which it routed parallel to the supply cable 30. The terminals 14 of each field device 4 are connected to the DC supply cable 32 such that the generated DC voltage is tapped off. Any other embodiment of a line protection device can also be used in place of the fuses 24 and 26.

FIG. 2 illustrates an apparatus 2 for supplying at least one field device 4 in accordance with the invention. This apparatus 2 according to the invention differs from the apparatus 2 shown in FIG. 1 by virtue of the fact that the DC-voltage side of the DC voltage supply device 28 can be connected to two lines 36 and 38 of the power cable 30 by means of a two-pole switch 34. In this embodiment, the multi-pole main switch 22 and the two-pole main switch 34 form one unit. These two switches 22 and 34 are operatively coupled to one another. If the multi-pole main switch 22 is closed, the two-pole switch 34 has already been interrupted. This is commonly referred to as a break-before-make switch. The two-pole switch 34 can only be closed after the multi-pole main switch 22 has been opened. During this latching time, each switched mode power supply 10 is no longer connected to a power supply system 6, and the DC voltage supply device 28 is not yet connected to the lines 36 and 38 of the power cable 30. To prevent power interruption to the switched mode power supply 10 of each field device 4, the switched mode power supply 10 has a backup. Since commercially available switched mode power supplies 10 are typically already designed with a backup, only the backup may need to be matched to the latching time.

The disclosed embodiment according to the invention of the apparatus 2 for supplying power to at least one field device 4 obviates the need for a separate DC supply cable 32. Elimination of this DC supply cable 32 also obviates the need for additional plug connectors on the field devices 4, which provides considerable cost advantages in particular with devices offering a high level of protection.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An apparatus for supplying DC power to input terminals of at least one field device operating on AC power via a single AC power cable, comprising:
    a multi-pole main switch having an input side receiving an AC voltage from a power mains and an output side supplying a switched AC voltage to output terminals of the apparatus;
    an AC power cable connecting the output terminals to the at least one field device;
    a DC voltage supply device having an input side receiving the AC voltage from the power mains and a DC voltage output side;
    a two-pole switch switchably connecting the DC voltage output side to two wires of the AC power cable, wherein the multi-pole main switch and the two-pole switch are ganged so as to supply only one of the switched AC voltage and the DC voltage to the at least one field device over the AC power cable.

2. The apparatus of claim 1, wherein each field device comprises a switched mode power supply which is buffered so as to bridge brief interruptions of AC power from the power mains.

3. The apparatus of claim 1, wherein the multi-pole main switch and the two-pole switch are ganged so that the multi-pole main switch and the two-pole switch are prevented from being closed at the same time.

4. The apparatus of claim 1, wherein the multi-pole main switch and the two-pole switch form a single unit.

5. The apparatus of claim 1, wherein the multi-pole main switch is a load-break switch.

6. The apparatus of claim 1, wherein the field device is a converter.

7. The apparatus of claim 1, wherein the field device is a motor starter.

8. The apparatus of claim 1, wherein the field device is an input/output module.

9. The apparatus of claim 1, further comprising a fuse disposed on the input side of the multi-pole switch or on the input side of the DC voltage supply device, or both, as line protection.

* * * * *